United States Patent
Kobayashi

(10) Patent No.: US 11,750,229 B2
(45) Date of Patent: Sep. 5, 2023

(54) ELECTROMAGNETIC WAVE TRANSMISSION DEVICE AND ELECTROMAGNETIC WAVE COMMUNICATION SYSTEM

(71) Applicant: PIONEER CORPORATION, Tokyo (JP)

(72) Inventor: Hideki Kobayashi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 125 days.

(21) Appl. No.: 17/605,984

(22) PCT Filed: Mar. 31, 2020

(86) PCT No.: PCT/JP2020/014819
§ 371 (c)(1),
(2) Date: Oct. 22, 2021

(87) PCT Pub. No.: WO2020/217881
PCT Pub. Date: Oct. 29, 2020

(65) Prior Publication Data
US 2022/0209796 A1    Jun. 30, 2022

(30) Foreign Application Priority Data

Apr. 22, 2019   (JP) ................................ 2019-080688

(51) Int. Cl.
*H04B 1/00*          (2006.01)
*H04B 1/04*          (2006.01)
(Continued)

(52) U.S. Cl.
CPC ........... *H04B 1/006* (2013.01); *H04B 1/0014* (2013.01); *H04B 1/0458* (2013.01); *H04B 2001/0416* (2013.01)

(58) Field of Classification Search
None
See application file for complete search history.

(56) References Cited

U.S. PATENT DOCUMENTS 8,718,544 B2 * 5/2014 Kawasaki ................ H04B 1/04
455/39
9,178,725 B2 * 11/2015 Chang ..................... H04L 45/60
(Continued)

FOREIGN PATENT DOCUMENTS

JP    2012191520 A    10/2012
JP    2010041204 A     2/2020
KR   20190127886 A *  11/2019  ............... H04B 1/04

OTHER PUBLICATIONS

Wang, Jue et al., "15 Gbps Wireless Link Using W-band Reonant Tunnelling Diode Transmitter", Proceedings of the 2018 15th European Radar Conference (Nov. 29, 2018).
(Continued)

*Primary Examiner* — Pablo N Tran
(74) *Attorney, Agent, or Firm* — Procopio, Cory, Hargreaves & Savitch LLP

(57) ABSTRACT

An electromagnetic wave transmission device according to the present invention includes: a transmission unit that has, in voltage-current characteristics, a local maximum value and a local minimum value located on a higher voltage side than the local maximum value and transmits an electromagnetic wave indicating a modulation signal; and a modulation unit which modulates an acquired digital signal to the modulation signal using first voltage values of two or more levels in a first voltage region, which is equal to or greater than a voltage of the local maximum value and is equal to or less than a voltage of the local minimum value, and a second voltage value in a second voltage region, which is less than the voltage of the local maximum value, and a third voltage value in a third voltage region, which is on a higher voltage side than the voltage of the local minimum value. A first signal which transits to any one voltage value of the first voltage values from any voltage value in the first voltage region via the second voltage value and a second signal
(Continued)

which transits to the any one voltage value from the any voltage value via the third voltage value are the same signals. The modulation unit selects, out of the first signal and the second signal, the signal having a smaller total transition potential difference.

10 Claims, 13 Drawing Sheets

(51) Int. Cl.
    *H04B 1/06*     (2006.01)
    *H03B 7/06*     (2006.01)
    *H04L 27/04*     (2006.01)

(56) References Cited

U.S. PATENT DOCUMENTS

| | | | |
|---|---|---|---|
| 9,590,663 B2* | 3/2017 | Aono | H03F 3/24 |
| 2016/0336973 A1* | 11/2016 | Aono | H04L 27/20 |
| 2022/0094368 A1* | 3/2022 | Passamani | H03M 1/0836 |
| 2022/0103406 A1* | 3/2022 | Kobayashi | H03B 7/08 |

OTHER PUBLICATIONS

Diebold, S. et al., "Modulation Schemes for Resonant Tunneling Diodes to Enhance the Data-Rate of Wireless Communications", 2016 41st International Conference on Infrared, Millimeter, and Terahertz waves (Dec. 1, 2016).
International Search Report dated Jun. 23, 2020 from International Application No. PCT/JP2020/014819, 2 pages.

* cited by examiner

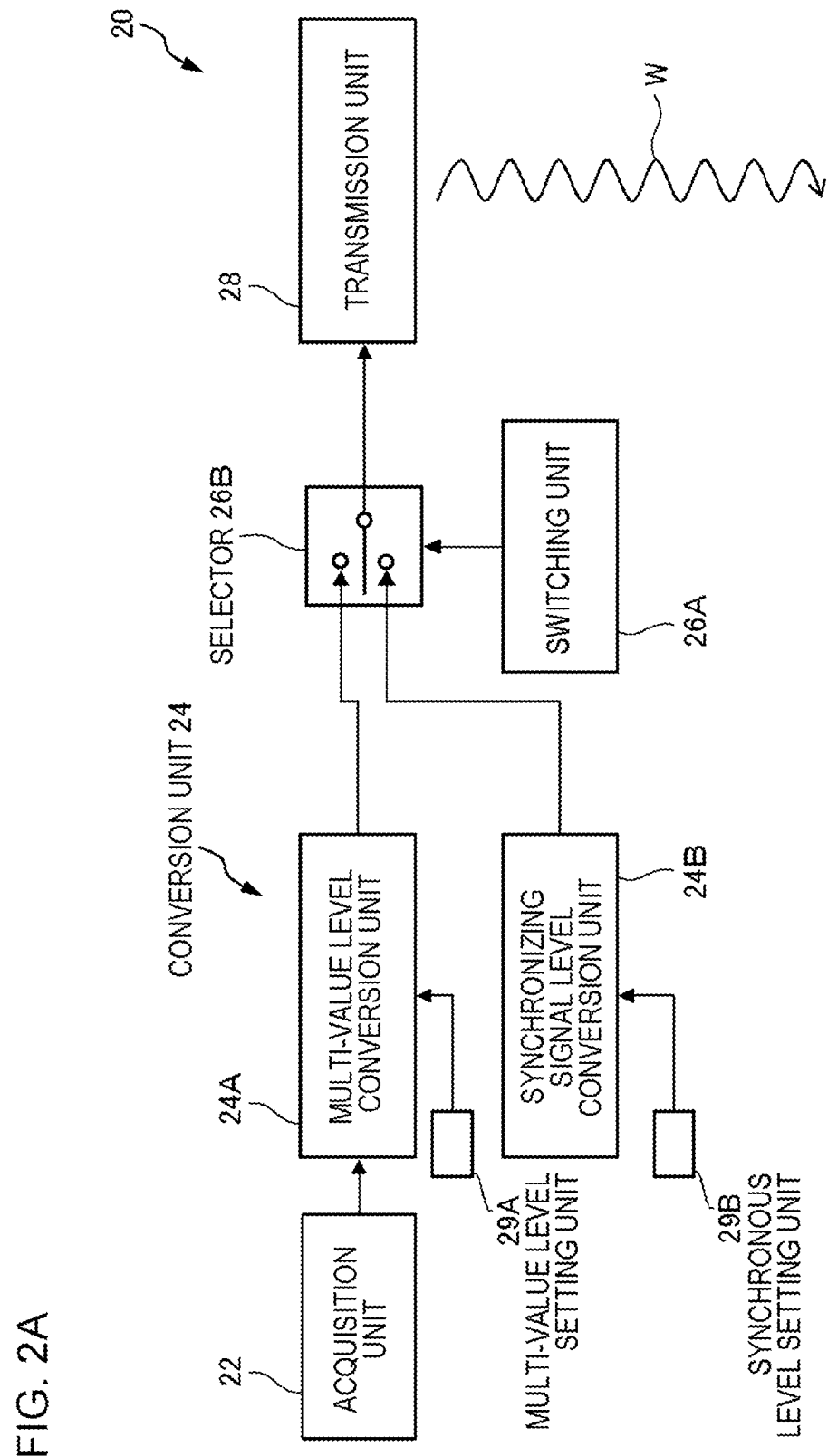

TOTAL TRANSITION POTENTIAL
DIFFERENCE = 50 mV

TOTAL TRANSITION POTENTIAL
DIFFERENCE = 90 mV

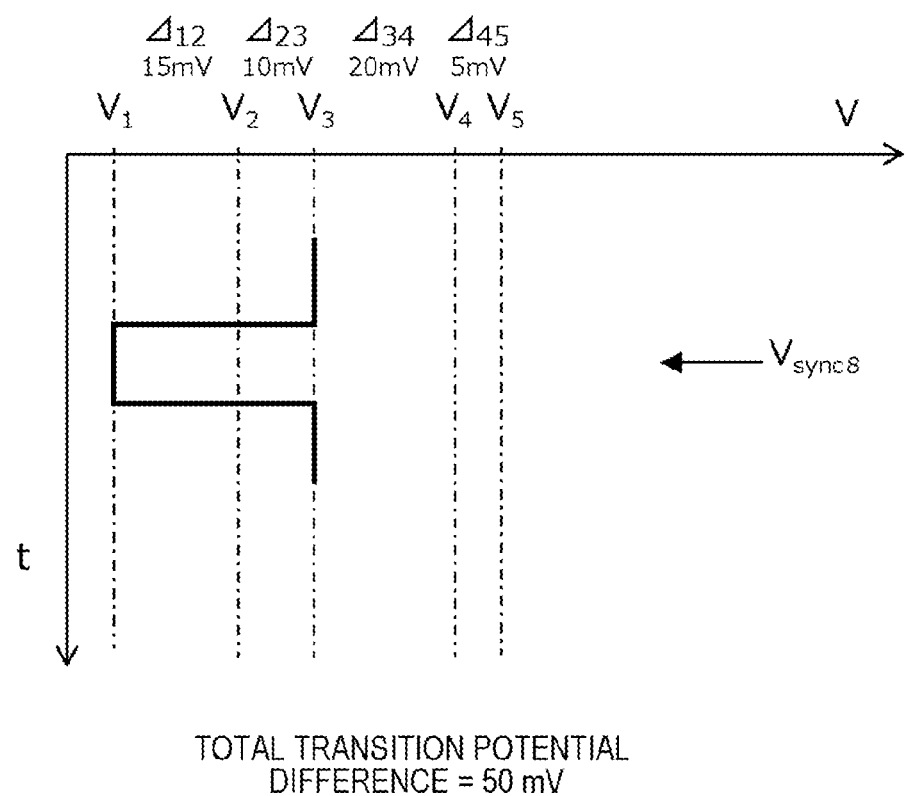

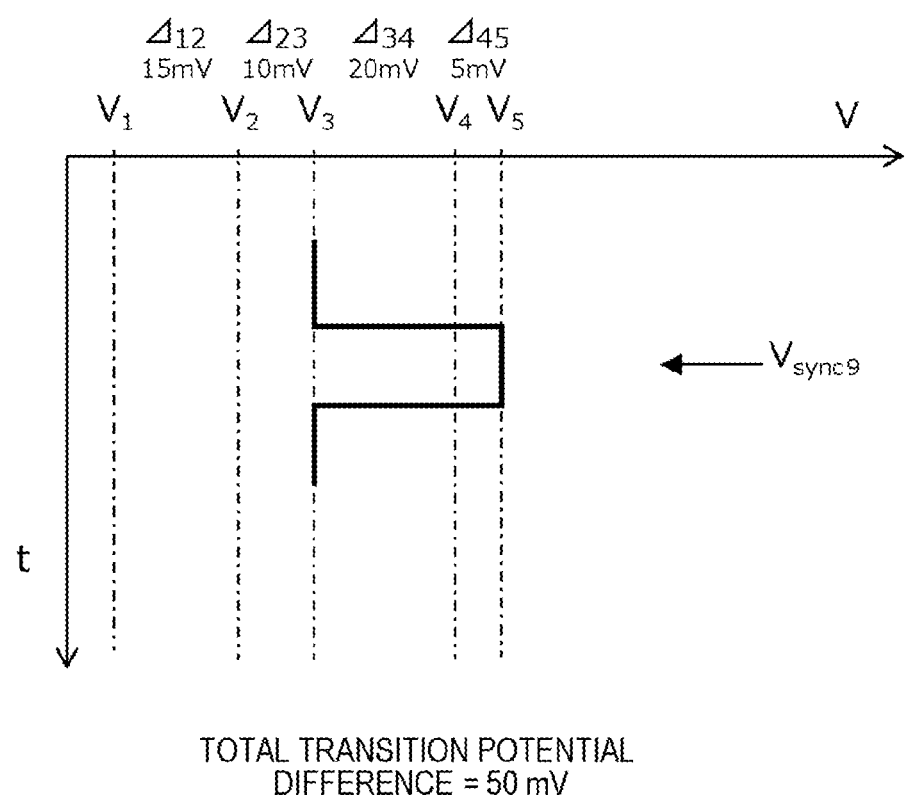

TOTAL TRANSITION POTENTIAL
DIFFERENCE = 60 mV

TOTAL TRANSITION POTENTIAL
DIFFERENCE = 70 mV

ELECTROMAGNETIC WAVE TRANSMISSION DEVICE AND ELECTROMAGNETIC WAVE COMMUNICATION SYSTEM

CROSS-REFERENCE TO RELATED APPLICATIONS

This application is a U.S. National Stage entry of PCT Application No: PCT/JP2020/014819 filed Mar. 31, 2020, which claims priority to Japanese Patent Application No. 2019-080688 filed Apr. 22, 2019, the contents of which are incorporated herein by reference.

TECHNICAL FIELD

A present invention relates to an electromagnetic wave transmission device and an electromagnetic wave communication system.

BACKGROUND ART

There is known an Amplitude-Shift keying modulation method (hereinafter referred to as an ASK modulation method) as a modulation method for communication used for an oscillation element of electromagnetic wave transmission. In addition, as the modulation method for communication, an On Off keying modulation method (hereinafter referred to as an OOK modulation method) is also known as one method included in the ASK modulation method.

Here, Patent Document 1 discloses a technique regarding the ASK modulation method which uses a resonant tunneling diode (hereinafter referred to as RTD for a Resonant Tunneling Diode) as the oscillation element for electromagnetic wave transmission.

Specifically, the technique is a technique in which two values are indicated by switching data of an oscillation region of an RTD (for example, a signal which corresponds to "on") and data of a non-oscillation region (for example, a signal which corresponds to "off"), that is, a technique in which "on" and "off" are indicated by a difference of amplitude.

Further, Patent Document 2 discloses a technique regarding the ASK modulation method using a terahertz wave of continuous oscillation of an RTD or the like. Specifically, the technique is a technique in which variable light having a changeable intensity is make incident to a modulation element as a signal light in a superposed manner, and the amplitude of the terahertz wave is modulated according to a signal intensity.

RELATED ART DOCUMENTS

Patent Documents

[Patent Document 1] Japanese Unexamined Patent Application Publication No. 2012-191520
[Patent Document 2] Japanese Unexamined Patent Application Publication No. 2010-41204

SUMMARY OF INVENTION

Problem to be Solved

However, since the techniques disclosed in Patent Document 1 and Patent Document 2 are a technique indicating two values by a difference of amplitude, there is a limit to the acceleration of a transmission speed (or a communication speed).

An example of a problem to be solved by the present invention is to accelerate a transmission speed.

Solution to Problem

The invention described in claim 1 is an electromagnetic wave transmission device including:

a transmission unit that has, in voltage-current characteristics, a local maximum value and a local minimum value located on a higher voltage side than the local maximum value and transmits an electromagnetic wave indicating a modulation signal;

an acquisition unit acquiring a digital signal; and a modulation unit modulating the digital signal to the modulation signal using first voltage values of two or more levels in a first voltage region, which is a voltage region which is equal to or greater than a voltage of the local maximum value and is equal to or less than a voltage of the local minimum value, and a second voltage value in a second voltage region, which is a voltage region less than the voltage of the local maximum value, and a third voltage value in a third voltage region, which is a voltage region on a higher voltage side than the voltage of the local minimum value, in which a first signal which transits from any voltage value out of the first voltage values of two or more levels in the first voltage region to any one voltage value out of voltage values of two or more levels of the first voltage values via the second voltage value, and a second signal which transits from the any voltage value to the any one voltage value via the third voltage value are the same signals, and in which the modulation unit selects, out of the first signal and the second signal, the signal having a smaller total transition potential difference of the modulation signal in a case where a total transition potential difference of the first signal and a total transition potential difference of the second signal are different.

BRIEF DESCRIPTION OF DRAWINGS

FIG. 2A is a schematic diagram of an electromagnetic wave transmission device of the present embodiment.

FIG. 7A is a fourth example (modulation signal $V_{sync8}$) of the modulation signal transmitted by the electromagnetic wave transmission device of the present embodiment.

FIG. 7B is a second comparative example (modulation signal $V_{sync9}$) of the modulation signal transmitted by an electromagnetic wave transmission device of the comparative embodiment.

FIG. 9D is a diagram showing a fourth example of a relationship between a graph indicating voltage-current characteristics of the element oscillating an electromagnetic wave which is provided in the electromagnetic wave transmission device of the present embodiment and a graph showing voltage-output level characteristics.

DESCRIPTION OF EMBODIMENT

<Summary>

Figure 1:
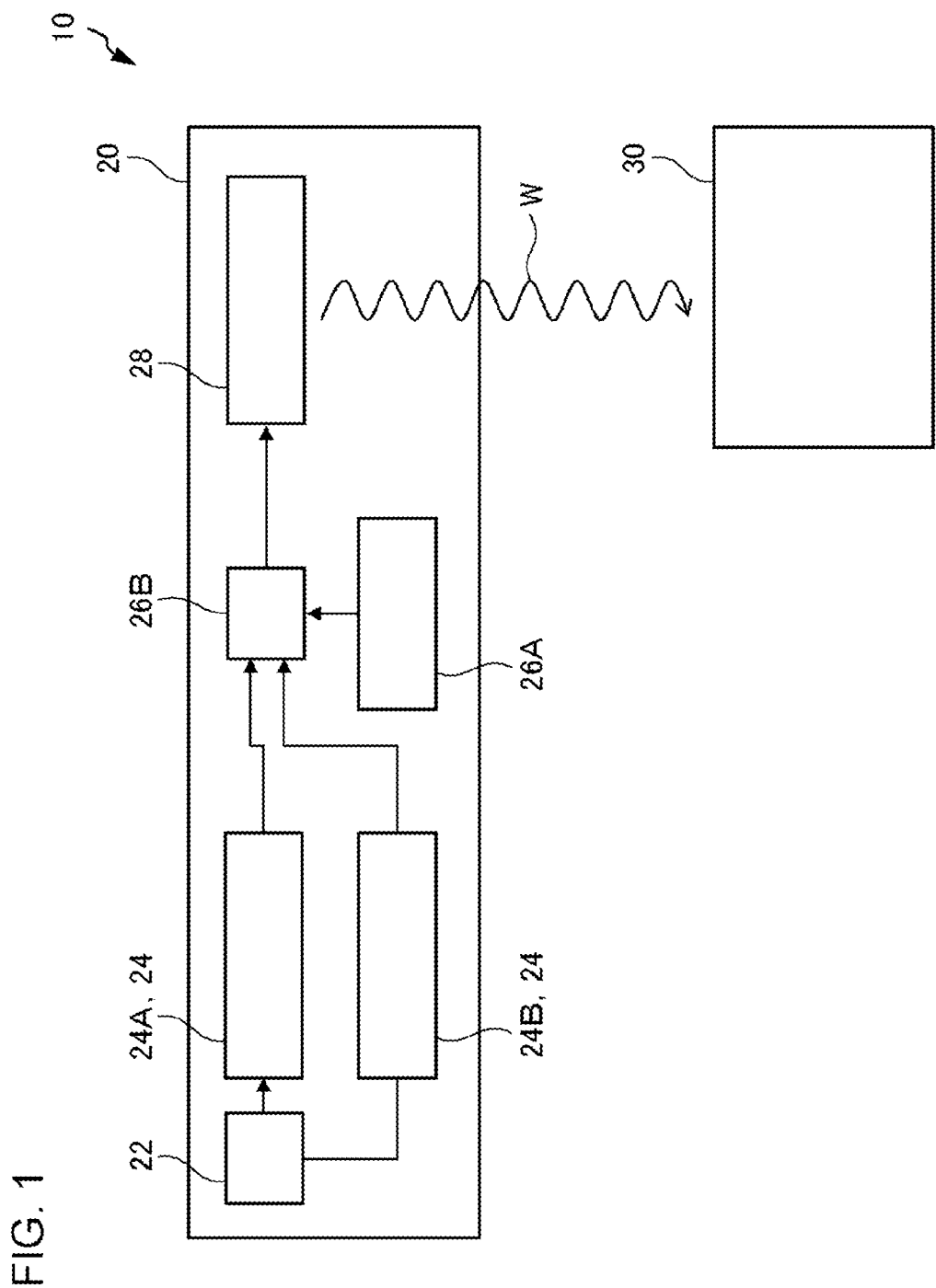
FIG. 1 is a schematic diagram of an electromagnetic wave communication system of the present embodiment.

The present embodiment (an example of the present invention) is explained below. First, a function and a configuration of an electromagnetic wave communication system 10 (see FIG. 1) of the present embodiment will be described with reference to drawings. Then, an operation of the electromagnetic wave communication system 10 of the present embodiment will be described with reference to drawings. Meanwhile, an effect of the present embodiment is explained in a description regarding the operation. In addition, in all the drawings referred to in the present specification, constituent elements having the same function are given the same reference numerals, and descriptions thereof will not be repeated in the specification.

<Configuration>

FIG. 1 is a schematic diagram of the electromagnetic wave communication system 10 of the present embodiment. The electromagnetic wave communication system 10 includes an electromagnetic wave transmission device 20 and an electromagnetic wave reception device 30. The electromagnetic wave communication system 10 has a function to receive an electromagnetic wave W transmitted by the electromagnetic wave transmission device 20 with the electromagnetic wave reception device 30.

The electromagnetic wave W in the present embodiment is assumed to be an electromagnetic wave indicating a modulation signal to be later described. Further, the electromagnetic wave W in the present embodiment is assumed to be, as an example, a terahertz wave. Here, a terahertz wave is said to be an electromagnetic wave having a wavelength shorter than a millimeter wave and longer than an infrared ray. The terahertz wave is an electromagnetic wave which has characteristics of both of a light wave and a radio wave, and has characteristics of passing through (or likely to pass through) through, for example, cloth, paper, wood, plastic, ceramics, or the like, and not passing through (or unlikely to pass through) metal, water, or the like. Generally, a frequency of a terahertz wave is said to be around 1 THz (a wavelength thereof corresponds to around 300 μm), however, there is no clear definition regarding a range of the frequency. Then, in this specification, the range of the wavelength of the terahertz wave is defined to be equal to or greater than 70 GHz and equal to or less than 10 THz.

[Electromagnetic Wave Transmission Device]

FIG. 2A is a schematic diagram of the electromagnetic wave transmission device 20 of the present embodiment. The electromagnetic wave transmission device 20 has a function to transmit the electromagnetic wave W indicating a multi-value modulated modulation signal. The electromagnetic wave transmission device 20 includes, as an example, an acquisition unit 22, a conversion unit 24 (an example of a modulation unit), a switching unit 26A, a selector 26B, a transmission unit 28, a multi-value level setting unit 29A, and a synchronous level setting unit 29B.

(Acquisition Unit)

The acquisition unit 22 of the present embodiment has a function to acquire a digital signal of, as an example, a sound, an image, or the like. In addition, the acquisition unit 22 has a function to output an acquired digital signal to the conversion unit 24.

(Conversion Unit)

The conversion unit 24 of the present embodiment includes, as an example, a multi-value level conversion unit 24A and a synchronizing signal level conversion unit 24B. The multi-value level conversion unit 24A has a function to perform, using the digital signal (data for communication) from the acquisition unit 22 as an input, conversion to a multi-value level according to a multi-value level setting and output. Here, the multi-value level setting means setting of voltage levels, which are voltage levels (first voltage values $V_2$, $V_3$, $V_4$) of two or more levels in a first voltage region RA, a voltage level (a second voltage value $V_1$) in a second voltage region RB, and a voltage level (a third voltage value $V_5$) in a third voltage region to be described later (see FIG. 3).

The synchronizing signal level conversion unit 24B has a function to output a predetermined synchronizing signal level according to synchronous level setting. Here, the synchronous level setting means voltage level setting of the voltage levels of two or more levels in the first voltage region RA, the voltage level in the second voltage region RB, and the voltage value level in the third voltage region (see FIG. 3).

Figure 2B:
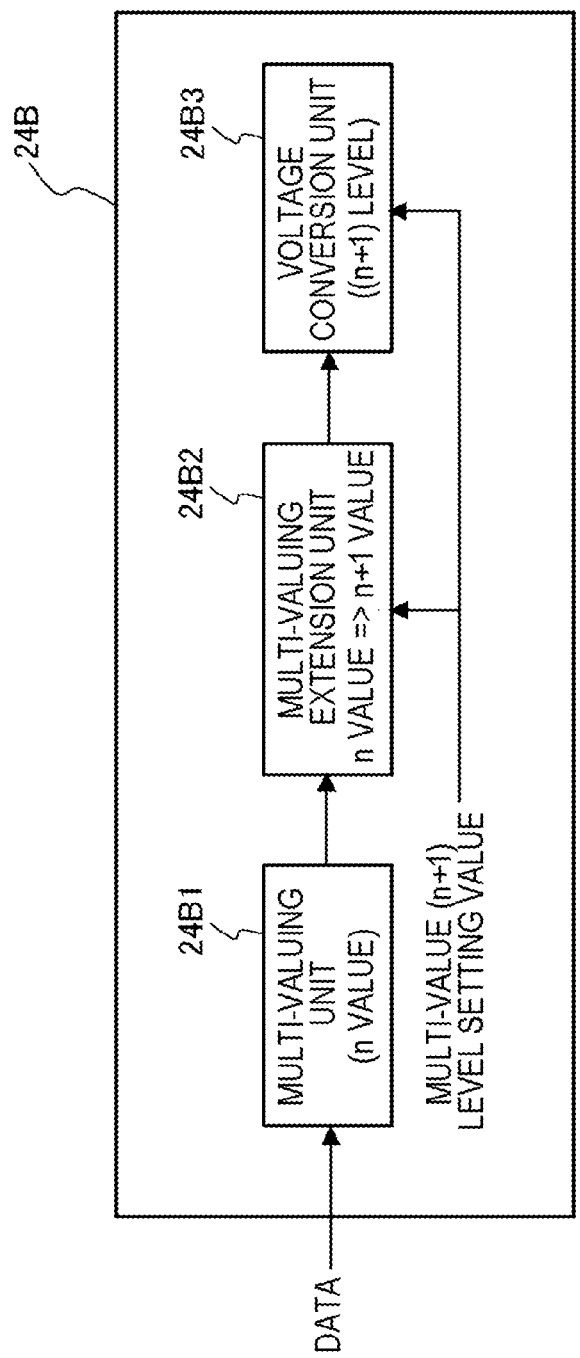
FIG. 2B is a configuration diagram showing in detail a synchronizing signal level conversion unit which is provided in the electromagnetic wave transmission device of the present embodiment.

Further, FIG. 2B is a configuration diagram showing the multi-value level conversion unit 24A of the present embodiment in detail. The multi-value level conversion unit 24A includes a multi-valuing unit 24B1, a multi-valuing extension unit 24B2, and a voltage conversion unit 24B3.

Details of the multi-valuing unit 24B1, the multi-valuing extension unit 24B2, and the voltage conversion unit 24B3 will be described later.

Then, the synchronizing signal level conversion unit 24B of the present embodiment has the same configuration as FIG. 2B.

(Switching Unit and Selector)

The switching unit 26A has a function to generate a switching timing of data selected and outputted to the transmission unit 28 by the selector 26B and input the switching timing to the selector 26B. Here, the data is data outputted by the multi-value level conversion unit 24A (hereinafter referred to as multi-value data) and data outputted by the synchronizing signal level conversion unit 24B (hereinafter referred to as synchronizing signal data).

The selector 26B has a function to output the synchronizing signal data and the multi-value data to the transmission unit 28 at different timings according to the switching timing of the data generated by the switching unit 26A.

(Transmission Unit)

The transmission unit 28 has a function to oscillate the data selected and inputted by the selector 26B as the electromagnetic wave W (a terahertz wave as an example in a case of the present embodiment). Therefore, the transmission unit 28 has an element to oscillate the terahertz wave. The element to oscillate the terahertz wave according to the present embodiment is, as an example, an RTD. Meanwhile, the element need not be an RTD as long as the element oscillates a terahertz wave.

Here, the voltage-current characteristics of the RTD will be described with reference to a graph of FIG. 3. Here, "voltage-current characteristics" means characteristics of a current with respect to a voltage in a two-dimensional graph which indicates a relationship between the voltage and the current.

Figure 3:
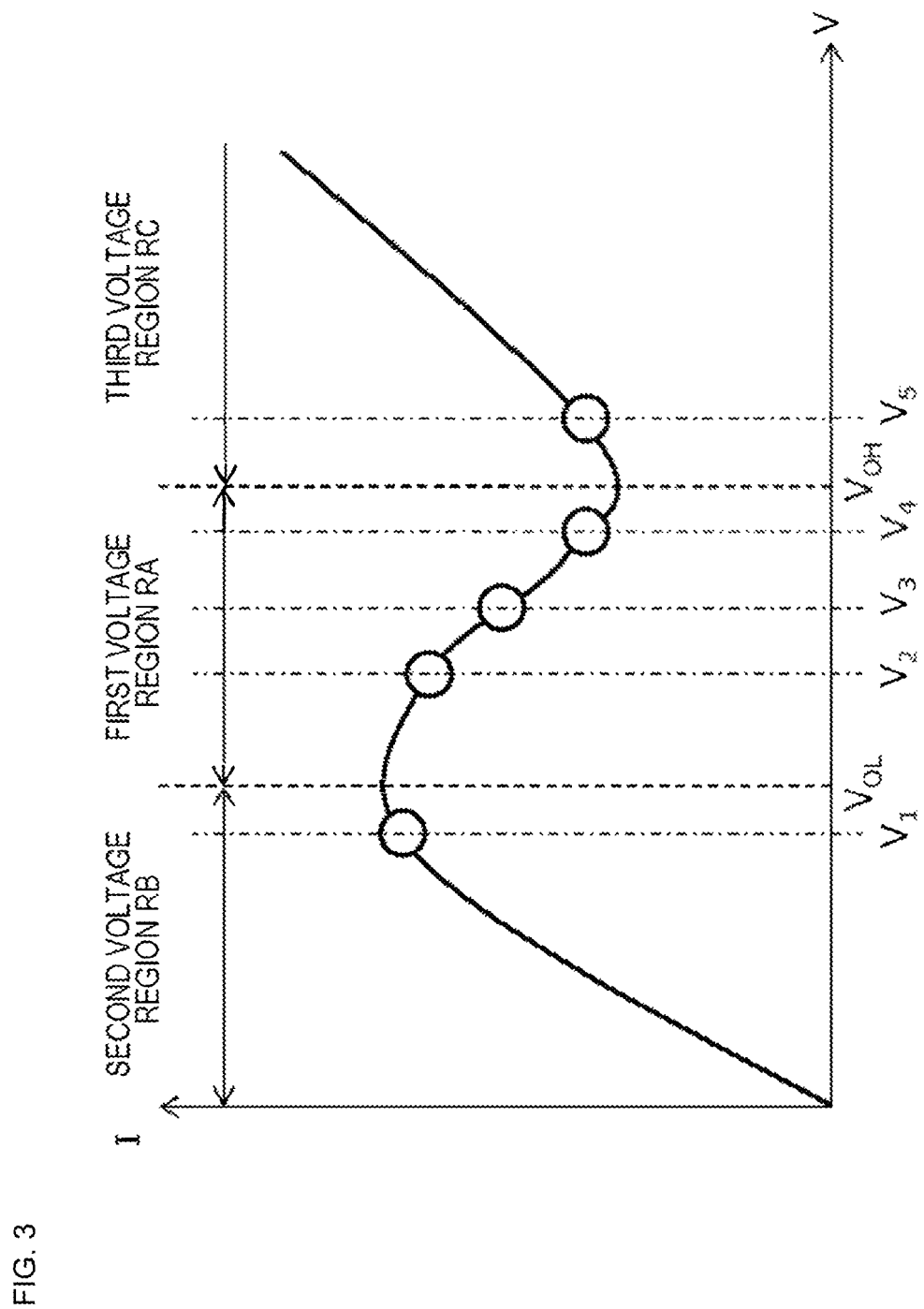
FIG. 3 is a graph indicating voltage-current characteristics of an element oscillating an electromagnetic wave which is provided in the electromagnetic wave transmission device of the present embodiment and voltage values of five levels.

FIG. 3 is a graph indicating the voltage-current characteristics of the RTD of the present embodiment, the first voltage values $V_2$, $V_3$, and $V_4$ at three levels in the first voltage region RA, the second voltage value $V_1$ of the second voltage region RB, and the third voltage value $V_5$ of the third voltage region RC.

The RTD has the local maximum value and the local minimum value located on a higher voltage side than the local maximum value in the voltage-current characteristics. Here, the voltage value at the local maximum value is defined as a voltage value $V_{OL}$ and the voltage value at the local minimum value is defined as a voltage value $V_{OH}$. Then, a spectrum of a current from the voltage value $V_{OL}$ to the voltage value $V_{OH}$ is considered to be a differential negative resistance region indicating a differential negative resistance characteristic. The differential negative resistance region is defined to be the first voltage region RA in the present specification. That is, the RTD has the differential negative resistance region (the first voltage region RA) indicating the differential negative resistance characteristics in the voltage-current characteristics of an operation region thereof. Further, in the present specification, out of voltage regions on both sides of the first voltage region RA in the graph of the voltage-current characteristics, a region on a side of lower voltage than the voltage value $V_{OL}$ is defined as the second voltage region RB, and a region on a side of higher voltage than the voltage value $V_{OH}$ is defined as the third voltage region RC. Then, in a case where the first voltage values $V_2$, $V_3$, $V_4$ in the first voltage region RA, and at least one voltage value of the second voltage value $V_1$ in the second voltage region RB and the third voltage value $V_5$ in the third voltage region are applied, the RTD functions as an element to oscillate the electromagnetic wave W.

Then, when the synchronizing signal data from the synchronizing signal level conversion unit 24B is inputted, the transmission unit 28 transmits the synchronizing signal which has a pattern corresponding to the first voltage values $V_2$, $V_3$, $V_4$ of three levels in the first voltage region RA, and at least one voltage value of the second voltage value $V_1$ of the second voltage region RB and the third voltage value $V_5$ of the third voltage region. Here, the synchronizing signal of the present embodiment is a signal to notify a detecting timing of the transmitted signal to the electromagnetic wave reception device 30, and has a role to cause the electromagnetic wave reception device 30 to recognize a part or all of voltage levels used for the modulation signal. Then, when the multi-value data from the multi-value level conversion unit 24A is inputted, the transmission unit 28 transmits the digital signal which has a pattern corresponding to the first voltage values $V_2$, $V_3$, $V_4$ of three levels in the first voltage region RA, and at least one voltage value of the second voltage value $V_1$ of the second voltage region RB and the third voltage value $V_5$ of the third voltage region. Here, in the present embodiment, as exemplified as the first voltage values $V_2$, $V_3$, $V_4$ in the first voltage region RA, voltage values of three levels are employed. However, the first voltage values in the first voltage region RA only need to be of two or more levels.

Due to the above, the multi-value level setting and the synchronous level setting in the present embodiment are set for the first voltage values $V_2$, $V_3$, $V_4$ at the three levels in the first voltage region RA, and at least one voltage value of the second voltage value $V_1$ of the second voltage region RB and the third voltage value $V_5$ of the third voltage region. In addition, the electromagnetic wave transmission device 20 in the present embodiment multi-value modulates the multi-value data and the synchronizing signal data and transmits the multi-value modulated data over the electromagnetic wave to the electromagnetic wave reception device 30.

[Electromagnetic Wave Reception Device]

The electromagnetic wave reception device 30 receives the electromagnetic wave W transmitted by the electromagnetic wave transmission device 20 and demodulates the received electromagnetic wave W to the digital signal. For example, when the digital signal is a signal which is a digitalized sound, the electromagnetic wave reception device 30 generates the detecting timing based on the synchronizing signal data of the electromagnetic wave received by the electromagnetic wave reception device 30, and demodulates the digital signal of the sound.

The above is the explanation on the configuration of the present embodiment.

<Operation>

Next, an operation of the electromagnetic wave communication system 10 of the present embodiment will be described with reference to drawings. Below, first, an entire flow is explained, and then the operation is explained referring to a specific example of a multi-value modulation. Meanwhile, the explanation below is made for a case, as an example, where a signal regarding a sound is communicated by the electromagnetic wave communication system 10. In addition, as described above, an effect of the present embodiment will be described along with an explanation below.

[Entire Flow]

The entire flow of the present embodiment is explained with reference to FIG. 1, FIG. 2A, and FIG. 2B.

First, the acquisition unit 22 acquires the digital signal regarding a sound from an external device (a drawing is omitted) and outputs an acquired digital signal to the conversion unit 24 (the multi-value level conversion unit 24A).

Then, the multi-value level conversion unit 24A performs, using as the digital signal (data for communication) from the acquisition unit 22 as an input, conversion to a multi-value level according to a multi-value level setting by the multi-value level setting unit 29A and output.

Here, as shown in FIG. 2B, the multi-value level conversion unit 24A includes the multi-valuing unit 24B1, the multi-valuing extension unit 24B2, and the voltage conversion unit 24B3, and a flow of operations of these units are as follows.

When the digital signal (data for communication) is inputted, the multi-valuing unit 24B1 multi-values the data and outputs an n-value (n≥3, in a case of the present embodiment, as an example, n=4) to the multi-valuing extension unit 24B2.

Next, the multi-valuing extension unit 24B2 converts the n-value to an n+1-value using, (for example, a multi-value (n+1) level setting value. Then, the multi-valuing extension unit 24B2 determines to set, as a voltage output at the time of non-oscillation, any one of a voltage level (the second voltage value $V_1$) in the second voltage region RB and a voltage value level (the third voltage value $V_5$) in the third voltage region. In this case, the multi-valuing extension unit 24B2 selects a smaller one of a total transition potential difference when going through the voltage level (the second voltage value $V_1$) in the second voltage region RB, and a total transition potential difference when going through the voltage level (the third voltage value $V_5$) in the third voltage region, the total transition potential differences being to be described later.

Then, the voltage conversion unit 24B3 converts the n+1 value (as an example, five values) to voltage of n+1 level (five levels) according to the multi-value level setting value and outputs the voltage to the selector 26B.

In addition, the synchronizing signal level conversion unit 24B outputs the predetermined synchronizing signal level according to the synchronous level setting by the synchronous level setting unit 29B.

Here, the synchronizing signal level conversion unit 24B has a configuration shown in FIG. 2B, and the same operation as that of the multi-value level conversion unit 24A.

Then, the switching unit 26A generates a switching timing of the multi-value data and the synchronizing signal data selected and outputted to the transmission unit 28 by the selector 26B and outputs the switching timing to the selector 26B. As a result, the selector 26B outputs the synchronizing signal data and the multi-value data to the transmission unit 28 at different timings according to the switching timing generated by the switching unit 26A.

Next, the transmission unit 28 transmits data (the data of n+1 level (as an example, five values) transmitted by the voltage conversion unit 24B3) selected and inputted by the selector 26B over the electromagnetic wave W. That is, the transmission unit 28 transmits the electromagnetic wave W indicating the modulation signal regarding the data.

Next, the electromagnetic wave reception device 30 receives the electromagnetic wave W transmitted by the transmission unit 28 (the electromagnetic wave transmission device 20), and generates a detecting timing based on the synchronizing signal data of the received electromagnetic wave W, and demodulates the multi-value data to the digital signal. As a result, the electromagnetic wave W received by the electromagnetic wave reception device 30 is demodulated to the digital signal.

The above is the explanation regarding the entire flow of the operation of the present embodiment.

[Specific Example of Multi-Value Modulation]

Next, a specific example of the modulation signal in the multi-value modulation will be explained with reference to following examples.

First Example and Second Example

First, a first example and a second example will be explained with reference to FIG. 3, FIG. 4, and FIG. 5.

Figure 4:
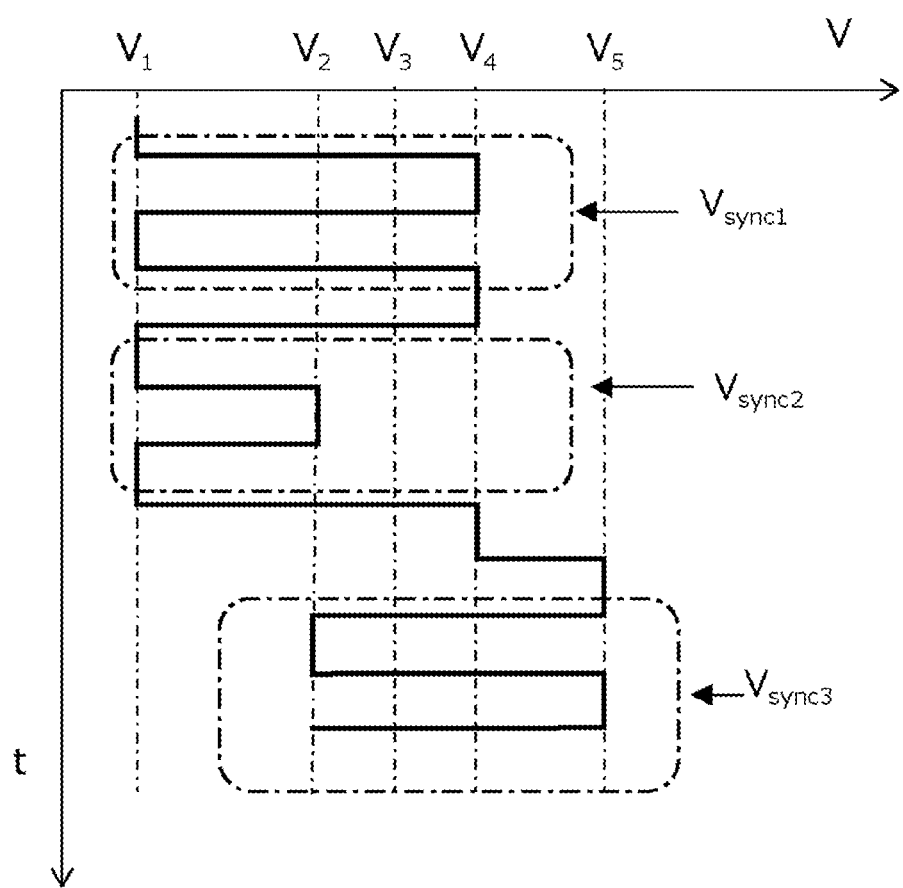
FIG. 4 is a first example (modulation signals $V_{sync1}$, $V_{sync2}$, $V_{sync3}$) of a modulation signal transmitted by the electromagnetic wave transmission device of the present embodiment.
Figure 5:
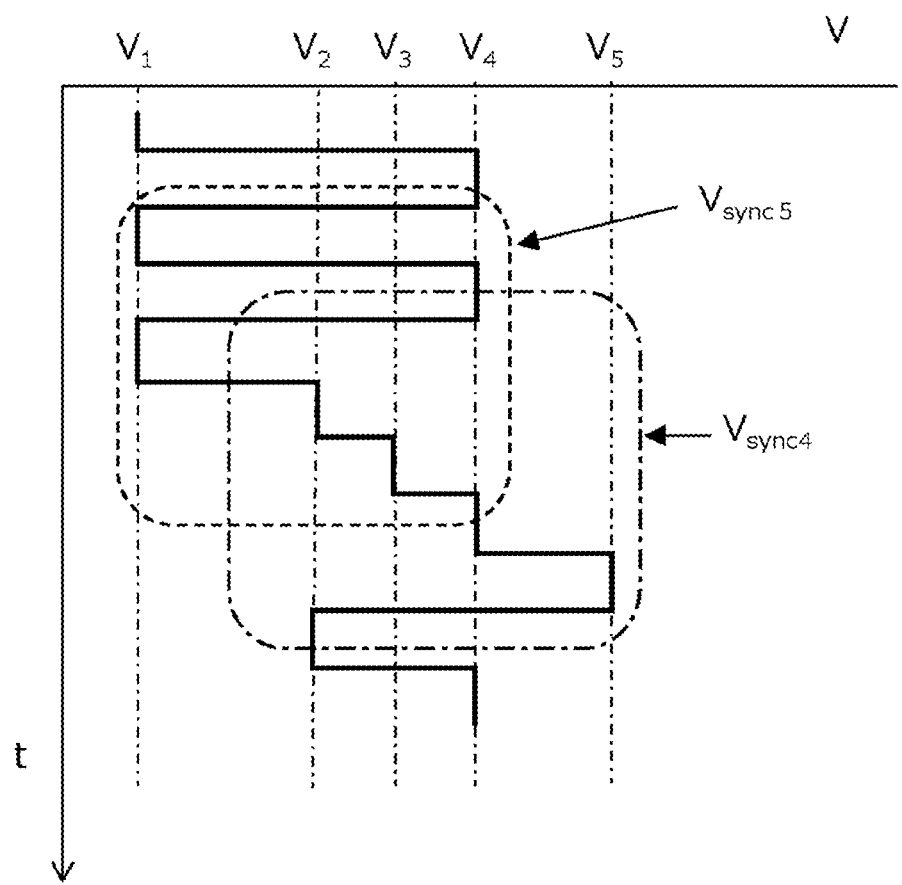
FIG. 5 is a second example (modulation signals $V_{sync4}$, $V_{sync5}$) of the modulation signal transmitted by the electromagnetic wave transmission device of the present embodiment.

Each of FIG. 4 and FIG. 5 is an example of the modulation signal transmitted by the electromagnetic wave transmission device 20 of the present embodiment, and FIG. 4 shows the first example and FIG. 5 shows the second example. Here, V indicates a voltage value and t indicates time in FIG. 4 and FIG. 5. $V_1$, $V_2$, $V_3$, $V_4$, and $V_5$ on an axis of a voltage value V indicate the second voltage value of the second voltage region RB, the first voltage values at three levels in the first voltage region RA, and the third voltage value of the third voltage region RC respectively. These modulation signal patterns include the multi-value data and the synchronizing signal data.

Meanwhile, $V_{sync1}$, $V_{sync2}$, and $V_{sync3}$ of FIG. 4 and $V_{sync4}$ and $V_{sync5}$ of FIG. 5 indicate portions corresponding to the synchronizing signal data of the modulation signals. Further, an entire pattern of FIG. 5 indicates the modulation signal including a portion corresponding to the synchronizing signal data and a portion other than the portion (a portion corresponding to modulation data). That is, the transmission unit 28 transmits the synchronizing signal at least as a portion of the modulation signals in the present embodiment.

As shown in FIG. 4 and FIG. 5, a signal generated by the conversion unit 24 in the present embodiment is the modulation signal in which voltage values of two or more levels out of the first voltage values $V_2$, $V_3$, $V_4$ in the first voltage region RA, and at least one voltage value of the second voltage value $V_1$ of the second voltage region RB and the third voltage value $V_5$ of the third voltage region are used. That is, the signal generated by the conversion unit 24 in the present embodiment is the modulation signal which is multi-value modulated using the voltage values of three or more levels. Specifically, the modulation signal is a signal which is multi-value modulated by converting data of, for example, m bit (m≥1, in a case of the present embodiment, as an example, m=2) to a voltage level of an n-value (n≥3, in a case of the present embodiment, as an example, n=4). Thus, in a case of the present embodiment, an amount of data which can be transmitted in the same period of time is large compared to the techniques (hereinafter referred to as comparative techniques) disclosed in the above-mentioned Patent Document 1 and Patent Document 2.

Therefore, the electromagnetic wave transmission device 20 of the present embodiment can accelerate a transmission speed compared to the comparative techniques. Accordingly, the electromagnetic wave communication system 10 of the present embodiment can accelerate a communication speed compared to the comparative techniques.

The second voltage region RB and the third voltage region RC are normally considered to be non-oscillation regions. A "non-oscillation region" means a region other than the voltage region to oscillate the electromagnetic wave W in the voltage-current characteristics of the RTD.

As shown in FIG. 4, however, in the present embodiment, it is set that at least one voltage value of the second voltage region RB and the third voltage region RC (see FIG. 3) is included in the synchronizing signals $V_{sync1}$, $V_{sync2}$, and $V_{sync3}$. Then, voltage transition including the voltage value in the second voltage region RB and the third voltage region RC (the first voltage value $V_1$ and the third voltage value $V_5$) which normally are non-oscillation regions allows an S/N ratio to be greater compared to, for example, a mode of voltage transition with a voltage value only in a normal oscillation region (corresponding to the first voltage region RA).

Therefore, the electromagnetic wave transmission device 20 in the present embodiment can transmit a signal which is hardly mis-detected by the electromagnetic wave reception device 30. Accordingly, the electromagnetic wave communication system 10 of the present embodiment has a high stability of communication in point of recognizability of the synchronizing signal. In addition, as explained above, since the electromagnetic wave transmission device 20 in the present embodiment can accelerate the transmission speed compared to the comparative techniques, the electromagnetic wave transmission device 20 in the present embodiment can transmit the signal which is hardly mis-detected by the electromagnetic wave reception device 30, in addition to the acceleration of the transmission speed, compared to the comparative techniques.

Further, the synchronizing signal $V_{sync1}$ in FIG. 4 (the first example) is set to a specific pattern in which a voltage value transits from any one of the minimum voltage value (the second voltage value $V_1$) and the maximum voltage value (the first voltage value $V_4$) to the other (a pattern in which the voltage value transits in a described order of $V_1$, $V_2$, $V_3$, $V_4$, or a pattern in which the voltage value transits in an order reverse to the described order). That is, the synchronizing signal $V_{sync1}$ of the present embodiment is a pattern including the maximum voltage value (the first voltage value $V_4$) and the minimum voltage value (the second voltage value $V_1$) out of voltage setting levels in the first voltage region RA. Thus, the maximum voltage value and the minimum voltage value of the received modulation signal are recognized by the electromagnetic wave reception device 30 of the present embodiment. Meanwhile, a digital signal is multi-value modulated using voltage values $V_1$, $V_2$, $V_3$, and $V_4$.

The synchronizing signal $V_{sync3}$ in FIG. 4 (the first example) is set to a specific pattern in which the voltage value transits from any one of the minimum voltage value (the first voltage value $V_2$) and the maximum voltage value (the third voltage value $V_5$) to the other (a pattern in which the voltage value transits in a described order of $V_2$, $V_3$, $V_4$, $V_5$, or a pattern in which the voltage value transits in an order reverse to the described order).

The synchronizing signal $V_{sync2}$ is set to a specific pattern in which a voltage value transits from any one of the minimum voltage value (the first voltage value $V_2$) and the maximum voltage value (the second voltage value $V_1$) to the other (a pattern in which the voltage value transits in a described order of $V_2$, $V_1$, or a pattern in which the voltage value transits in an order reverse to the described order). Meanwhile, the digital signal is multi-value modulated using voltage values $V_2$, $V_3$, $V_4$, and $V_5$.

Therefore, the electromagnetic wave transmission device 20 of the present embodiment can transmit the synchronizing signal which is easily recognized by the electromagnetic wave reception device 30. Accordingly, the electromagnetic wave communication system 10 of the present embodiment has the high stability of communication in point of recognizability of the synchronizing signal.

In addition, the synchronizing signals $V_{sync4}$ and $V_{sync5}$ in FIG. 5 (the second example) include any one of the voltage values (the second voltage value $V_1$ and the third voltage value $V_5$) of the second voltage region RB and the third voltage region RC (see FIG. 3), which are the normal non-oscillation regions, and are set to use four levels, which are all the levels, as multi-value levels which a digital signal can take. Thus, in the present embodiment, with the synchronizing signal in this manner, it becomes possible to transmit level voltages of the synchronizing signal as training data to the electromagnetic wave transmission device 20. Further, in the electromagnetic wave reception device 30, it becomes possible to extract each level voltage from the synchronizing signal and set a level of the multi-value data of the reception signal.

Therefore, the electromagnetic wave transmission device 20 of the present embodiment can cause the electromagnetic wave reception device 30 to recognize the level voltages of the modulation signal.

Further, in a case of the present embodiment, it is possible to generate the modulation signal using voltage values of two or more levels out of the first voltage values $V_2$, $V_3$, and $V_4$ in the first voltage region RA, and both the voltage values of the second voltage value $V_1$ of the second voltage region RB and the third voltage value $V_5$ of the third voltage region. However, in the present embodiment, for example, which voltage value out of the second voltage value $V_1$ of the second voltage region RB and the third voltage value $V_5$ of the third voltage region is to be used to generate the modulation signal is configured as follows.

Here, a signal which transits from any one voltage value of the first voltage values $V_2$, $V_3$, and $V_4$ to the second voltage value $V_1$ (an example of the first signal) and a signal which transits from the any one voltage value of the first voltage values $V_2$, $V_3$, and $V_4$, which is the same as the case of the first signal, to the third voltage value $V_5$ (an example of the second signal) are the same signals.

Then, in a case where a signal is caused to transit from any one voltage value of the first voltage values $V_2$, $V_3$, and $V_4$ to any one of the second voltage value $V_1$ and the third voltage value $V_5$, the multi-value level conversion unit 24A (the conversion unit 24) causes the signal to transit to the voltage value in which a total transition potential difference is smaller than the other. Here, a "total transition potential difference" indicates a total sum of potential differences altered from a potential before the transition (at a start timing) to a potential after the transition (at an ending timing) in a certain modulation signal. Specifically, in a case where a voltage value before the transition of a modulation signal is $V_1$ and thereafter, the voltage value after the transition via the voltage value $V_4$ is $V_3$, a total transition potential difference becomes a sum of a potential difference between $V_1$ and $V_4$ and a potential difference between $V_4$ and $V_3$. Accordingly, for example, in a case where any one voltage value of the first voltage values $V_2$, $V_3$, and $V_4$ is the first voltage value $V_2$ and a potential difference $\Delta V_{12}$ between the voltage value $V_2$ and the second voltage value $V_1$ is smaller than a potential difference $\Delta V_{25}$ between the voltage value $V_2$ and the third voltage value $V_5$, the multi-value level conversion unit 24A transits the signal to the second voltage value $V_1$ which is considered to make the total transition potential difference smaller. Further, for example, in a case where any one voltage value of the first voltage values $V_2$, $V_3$, and $V_4$ is the first voltage value $V_4$ and a potential difference $\Delta V_{24}$ between the voltage value $V_4$ and the second voltage value $V_1$ is greater than a potential difference $\Delta V_{45}$ between the voltage value $V_4$ and the third voltage value $V_5$, the multi-value level conversion unit 24A transits the signal to the third voltage value $V_5$ which is considered to make the total transition potential difference smaller.

Therefore, in the present embodiment, in a case where the modulation signal is generated using the voltage values of the first voltage region RA, and both the voltage values of the second voltage region RB and the third voltage region, it becomes possible to accelerate the transmission speed (the communication speed) more by making the total transition potential difference small in a manner described above.

The above is the explanation about the first example and the second example.

Meanwhile, the point described above, that is, a specific example regarding which voltage value out of the second voltage value $V_1$ of the second voltage region RB and the third voltage value $V_5$ of the third voltage region is to be used to generate the modulation signal will be explained later using a third example and examples thereafter.

Third Example

Figure 6A:
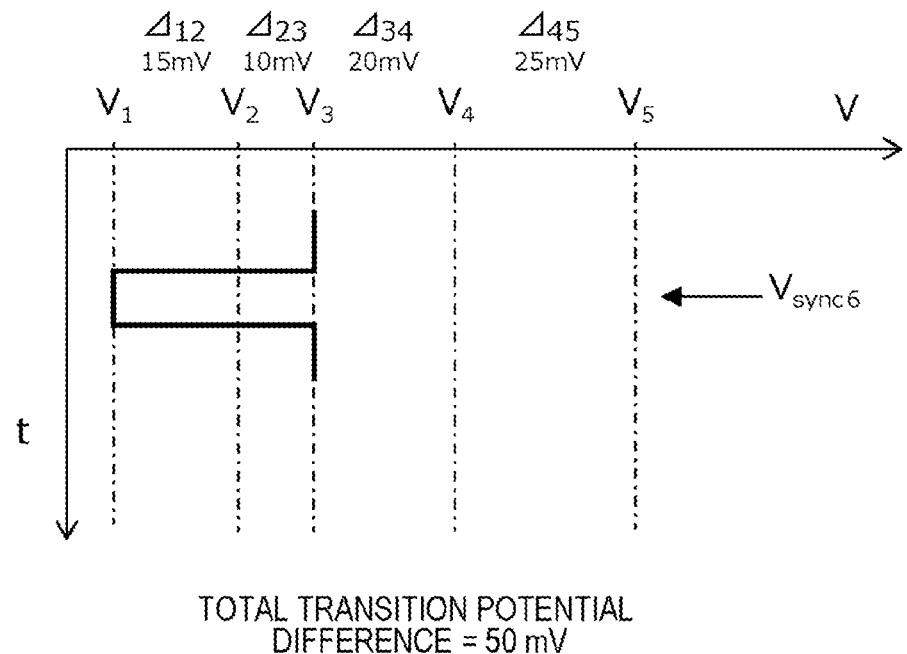
FIG. 6A is a third example (modulation signal $V_{sync6}$) of the modulation signal transmitted by the electromagnetic wave transmission device of the present embodiment.

Next, the third example will be explained with reference to FIG. 6A and FIG. 6B. Here, FIG. 6A is another example (the third example) of the modulation signal transmitted by the electromagnetic wave transmission device 20 of the present embodiment. In contrast, FIG. 6B is an example (a first comparative example) of a modulation signal transmitted by an electromagnetic wave transmission device of a comparative embodiment.

Figure 6B:
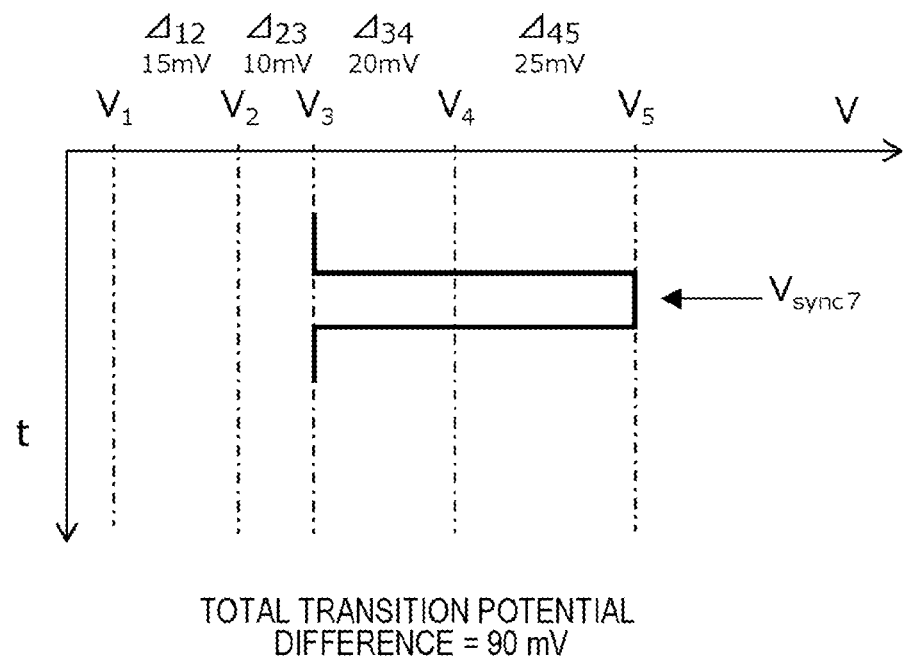
FIG. 6B is a first comparative example (modulation signal $V_{sync7}$) of a modulation signal transmitted by an electromagnetic wave transmission device of a comparative embodiment.

Here, as shown in FIG. 6A and FIG. 6B, in the first voltage value $V_2$, $V_3$, and $V_4$ at three levels in the first voltage region RA and the second voltage value $V_1$ of the second voltage region RB, and the third voltage value $V_5$ of the third voltage region, a potential difference between $V_1$ and $V_2$ is $\Delta_{12}$, a potential difference between $V_2$ and $V_3$ is $\Delta_{23}$, a potential difference between $V_3$ and $V_4$ is $\Delta_{34}$, and a potential difference between $V_4$ and $V_5$ is $\Delta_{45}$. Then, specifically, the potential difference $\Delta_{12}$, the potential difference $\Delta_{23}$, the potential difference $\Delta_{34}$, and the potential difference $\Delta_{45}$ are set to 15 mV, 10 mV, 20 mV, and 25 mV respectively. That is, in the present embodiment, in each of voltage values $V_2$, $V_3$, and $V_4$ of two or more levels of the first voltage values, the second voltage value $V_1$, and the third voltage value $V_5$, in a case where each voltage value is arranged in order from the smallest value, respective potential differences of voltage values which are adjacent to each other (the potential difference $\Delta_{12}$, the potential difference $\Delta_{23}$, the potential difference $\Delta_{34}$, and the potential difference $\Delta_{45}$) are potential differences which are different from each other. In addition, respective potential differences $\Delta_{12}$, $\Delta_{13}$, and $\Delta_{14}$ between each of voltage values $V_2$, $V_3$, and $V_4$ of two or more levels of the first voltage values and the second voltage value $V_1$ are different potential differences from respective potential differences $\Delta_{25}$, $\Delta_{35}$, $\Delta_{45}$ between each of voltage values $V_2$, $V_3$, $V_4$ of two or more levels of the first voltage values and the third voltage value $V_5$.

Both of the voltage value of the modulation signal $V_{sync6}$ (an example of the first signal) of FIG. 6A and the voltage value of the modulation signal $V_{sync7}$ (an example of the second signal) of FIG. 6B before the transition are the voltage values $V_3$, and both voltage values after the transition are also the voltage values $V_3$. These modulation signals $V_{sync6}$ and $V_{sync7}$ are different in a way that the modulation signal $V_{sync6}$ of FIG. 6A goes through the second voltage value $V_1$ of the second voltage region RB and a total transition potential difference thereof is 50 mV while the modulation signal $V_{sync7}$ of FIG. 6B goes through the third voltage value $V_5$ of the third voltage region and a total transition potential difference thereof is 90 mV. However, the modulation signal $V_{sync6}$ of FIG. 6A and the modulation signal $V_{sync7}$ of FIG. 6B are the same signals (it means signals having the same technical meaning).

Then, in the present embodiment, although the modulation signal $V_{sync6}$ of FIG. 6A and the modulation signal $V_{sync7}$ of FIG. 6B are the same signals, the modulation signal $V_{sync6}$ of FIG. 6A having the smaller total transition potential difference is selected.

Accordingly, the present embodiment can accelerate the transmission speed (the communication speed) by selecting the third example (see FIG. 6A), not the first comparative example of the comparative embodiment (see FIG. 6B), in a case where the modulation signal is generated using the voltage values in the first voltage region RA and both the voltage values of the second voltage region RB and the third voltage region.

The above is the explanation regarding the third example.

Forth Example

Then, a fourth example will be explained with reference to FIG. 7A and FIG. 7B. Here, FIG. 7A is another example (the fourth example) of the modulation signal transmitted by the electromagnetic wave transmission device 20 of the present embodiment. In contrast, FIG. 7B is an example (the second comparative example) of the modulation signal transmitted by the electromagnetic wave transmission device of the comparative embodiment.

Here, as shown in FIG. 7A and FIG. 7B, the potential difference $\Delta_{12}$, the potential difference $\Delta_{23}$, the potential difference $\Delta_{34}$, and the potential difference $\Delta_{45}$ are 15 mV, 10 mV, 20 mV, and 5 mV respectively. That is, in the present embodiment, in each of voltage values $V_2$, $V_3$, and $V_4$ of two or more levels of the first voltage values, the second voltage value $V_1$, and the third voltage value $V_5$, in a case where each voltage value is aligned in order from the smallest value, respective potential differences of voltage values which are adjacent to each other (the potential difference $\Delta_{12}$, the potential difference $\Delta_{23}$, the potential difference $\Delta_{34}$, the potential difference $\Delta_{45}$) are potential differences which are different from each other.

Both of the voltage values of the modulation signal $V_{sync8}$ (an example of the first signal) of FIG. 7A and the voltage value of the modulation signal $V_{sync9}$ (an example of the second signal) of FIG. 7B before the transition are the voltage values $V_3$, and both voltage values after the transition are also the voltage values $V_3$. These modulation signals $V_{sync8}$ and $V_{sync9}$ are different in a way that the modulation signal $V_{sync8}$ of FIG. 7A goes through the second voltage value $V_1$ of the second voltage region RB while the modulation signal $V_{sync9}$ of FIG. 7B goes through the third voltage value $V_5$ of the third voltage region. Both of total transition potential differences of $V_{sync8}$ and $V_{sync9}$ are 50 mV.

Then, in the present embodiment, although the modulation signal $V_{sync8}$ of FIG. 7A and the modulation signal $V_{sync9}$ of FIG. 7B are the same signals, the modulation signal $V_{sync8}$ of FIG. 7A having the smaller voltage value is selected out of the second voltage value $V_1$ and the third voltage value $V_5$.

Accordingly, in the present embodiment, heat emission of the RTD may be inhibited compared to a case where the modulation signal $V_{sync9}$ of FIG. 7B having a greater voltage value is selected out of the second voltage value $V_1$ and the third voltage value $V_5$.

The above is the explanation regarding the fourth example.

Fifth Example

Figure 8A:
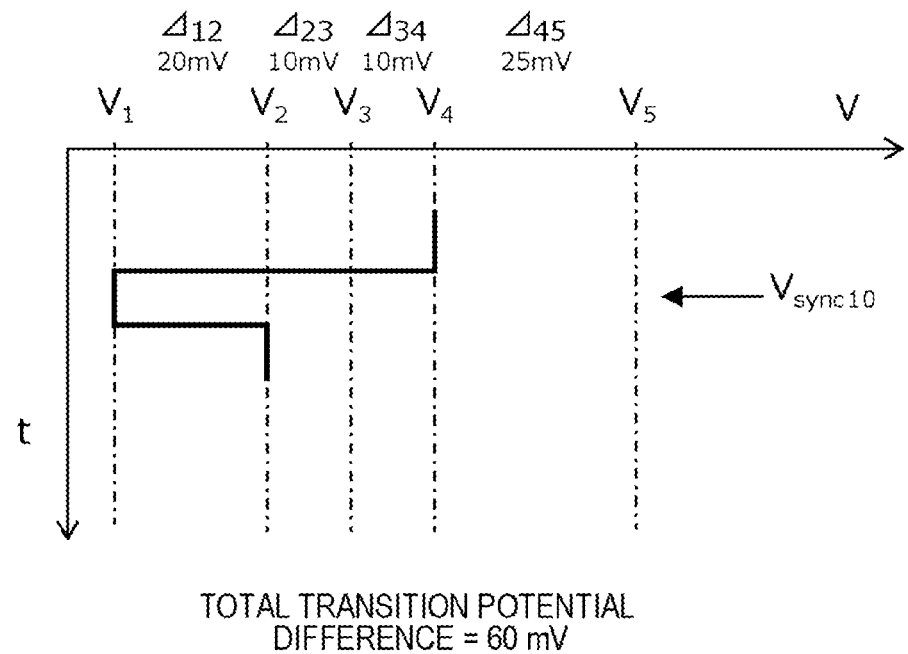
FIG. 8A is a fifth example (modulation signal $V_{sync10}$) of the modulation signal transmitted by the electromagnetic wave transmission device of the present embodiment.

Next, the fifth example will be explained with reference to FIG. 8A and FIG. 8B. Here, FIG. 8A is another example (the fifth example) of the modulation signal transmitted by the electromagnetic wave transmission device 20 of the present embodiment. In contrast, FIG. 8B is an example (a third comparative example) of a modulation signal transmitted by the electromagnetic wave transmission device of the comparative embodiment.

Figure 8B:
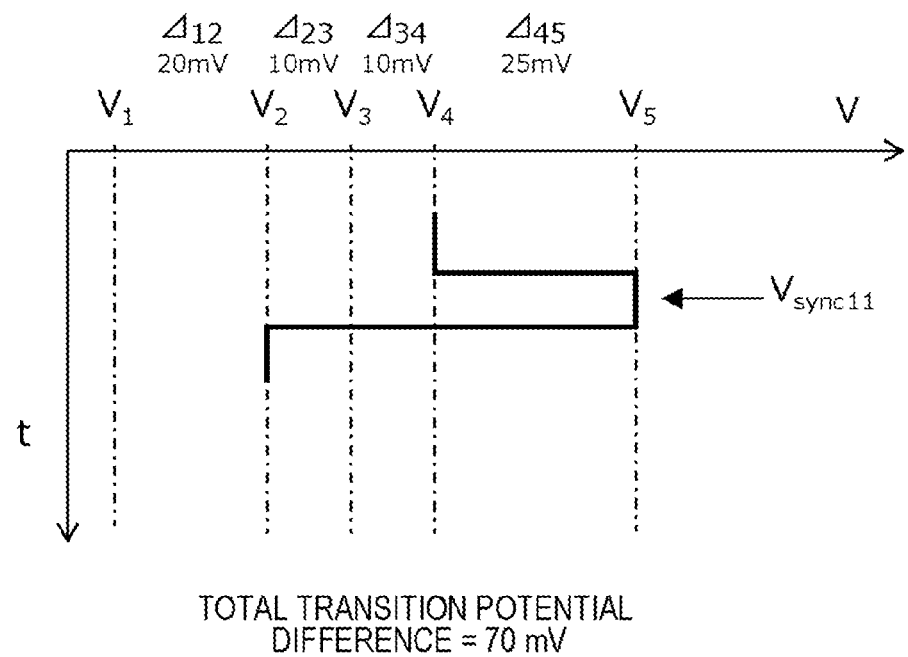
FIG. 8B is a third comparative example (modulation signal $V_{sync11}$) of the modulation signal transmitted by the electromagnetic wave transmission device of the comparative embodiment.

Here, as shown in FIG. 8A and FIG. 8B, respective potential differences $\Delta_{12}$, $\Delta_{13}$, and $\Delta_{14}$ between each of voltage values $V_2$, $V_3$, and $V_4$ of two or more levels of the first voltage values and the second voltage value $V_1$ are different potential differences from the respective potential differences $\Delta_{25}$, $\Delta_{35}$, and $\Delta_{45}$ between each of the voltage values $V_2$, $V_3$, and $V_4$ of two or more levels of the first voltage values and the third voltage value $V_5$.

Both of the voltage values of the modulation signal $V_{sync10}$ (an example of the first signal) of FIG. 8A and the modulation signal $V_{sync11}$ (an example of the second signal) of FIG. 8B before the transition are the voltage values $V_4$, and both voltage values after the transition are also the voltage values $V_2$. These modulation signals $V_{sync10}$ and $V_{sync11}$ are different in a way that the modulation signal $V_{sync10}$ of FIG. 8A goes through the second voltage value $V_1$ of the second voltage region RB and a total transition potential difference thereof is 60 mV while the modulation signal $V_{sync11}$ of FIG. 8B goes through the third voltage value $V_5$ of the third voltage region and a total transition potential difference thereof is 70 mV. However, the modulation signal $V_{sync10}$ of FIG. 8A and the modulation signal $V_{sync11}$ of FIG. 8B are the same signals.

Then, in the present embodiment, although the modulation signal $V_{sync10}$ of FIG. 8A and the modulation signal $V_{sync11}$ of FIG. 8B are the same signals, the modulation signal $V_{sync10}$ of FIG. 8A having the smaller total transition potential difference is selected.

Accordingly, the present embodiment can accelerate the transmission speed (the communication speed) by selecting the fifth example (see FIG. 8A), not the third comparative example of the comparative embodiment (see FIG. 8B), in a case where the modulation signal is generated using the voltage values in the first voltage region RA, and both the voltage values of the second voltage region RB and the third voltage region. Further, in the present embodiment, the heat emission of the RTD may be inhibited compared to a case where the third comparative example (see FIG. 8B) of the comparative embodiment is selected.

The above is the explanation regarding the fifth example.
[Supplementary Explanation on Relationship Between Voltage and Output Carrier Level]

Figure 9A:
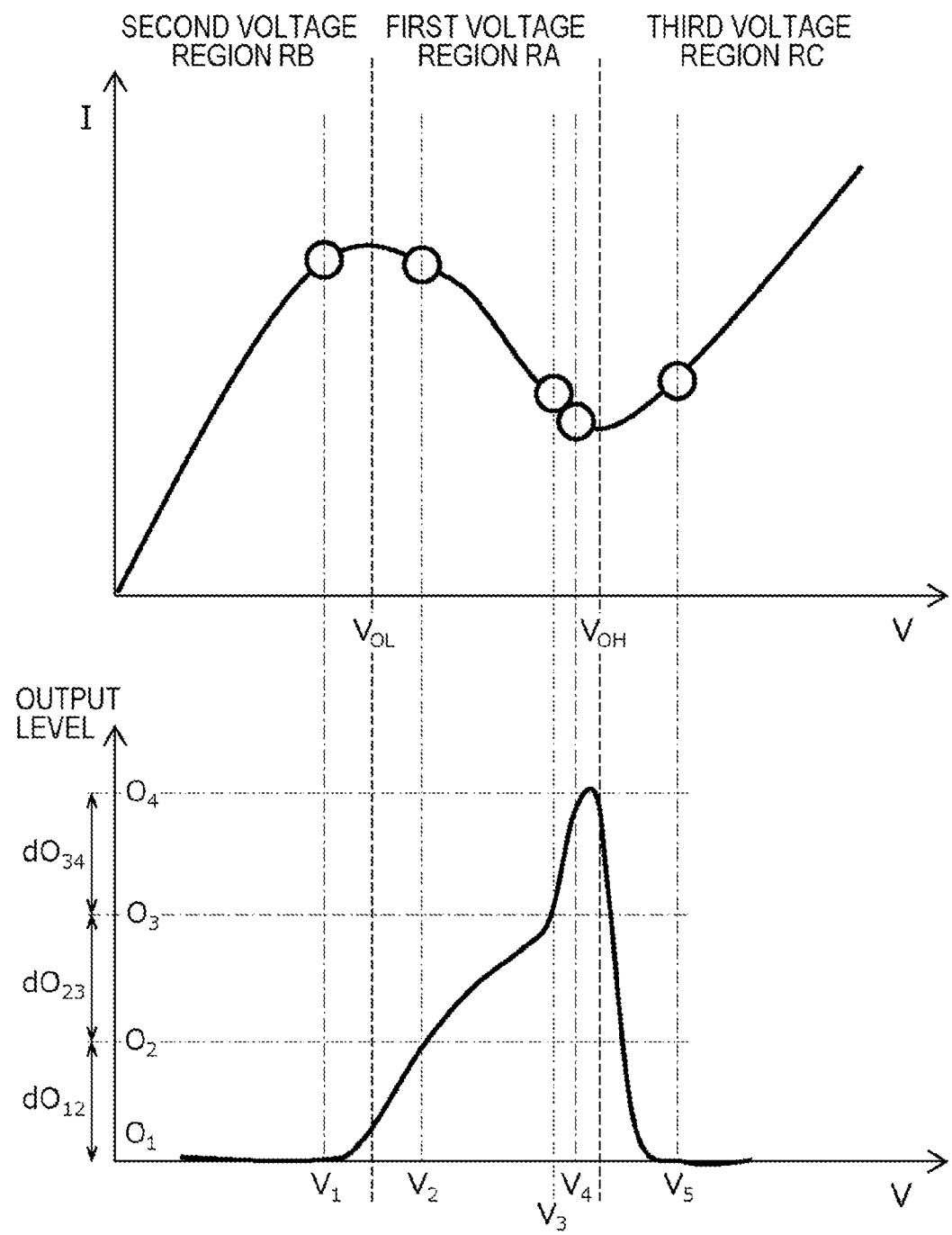
FIG. 9A is a diagram showing a first example of a relationship between a graph indicating voltage-current characteristics of the element oscillating an electromagnetic wave which is provided in the electromagnetic wave transmission device of the present embodiment and a graph showing voltage-output level characteristics.
Figure 9B:
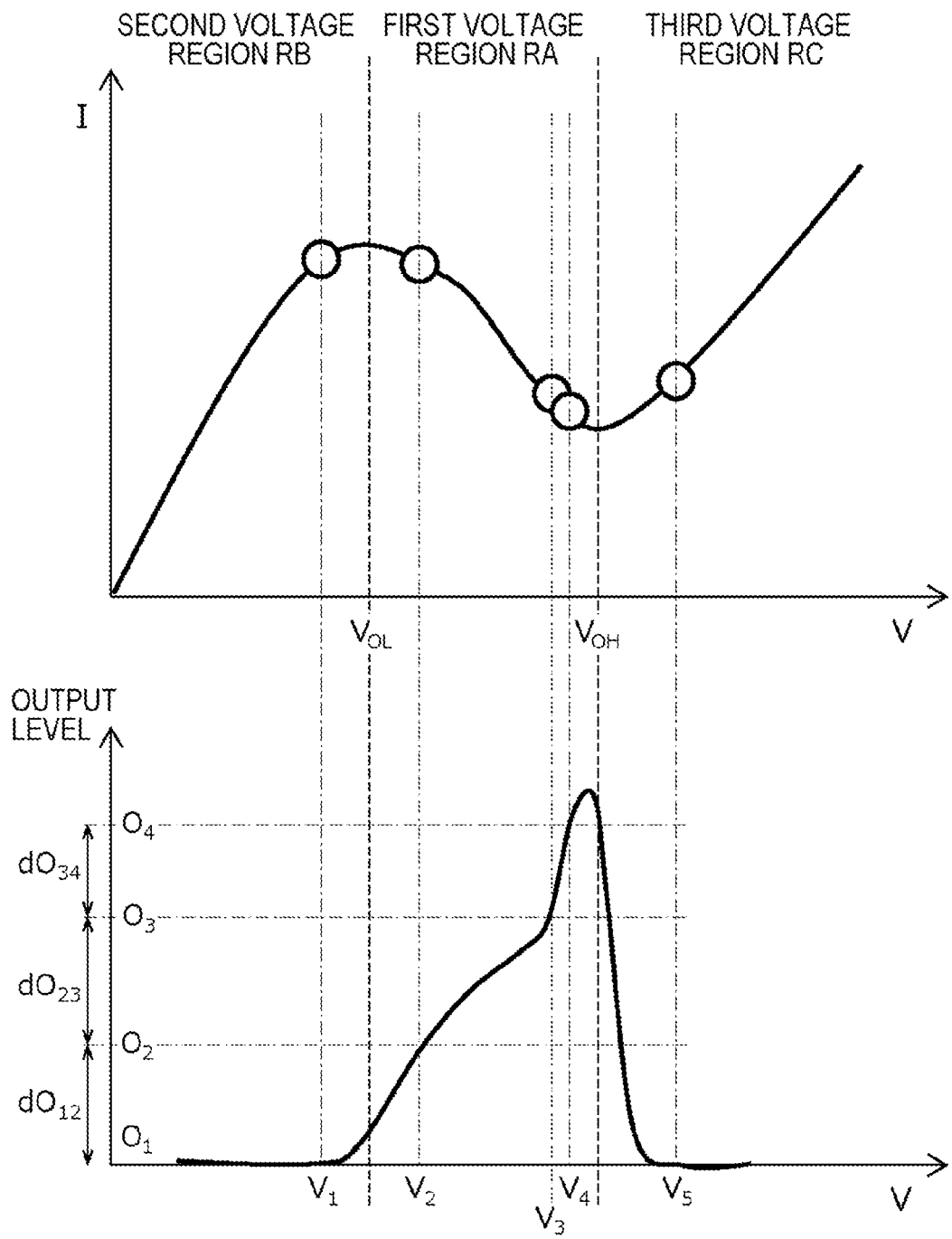
FIG. 9B is a diagram showing a second example of a relationship between a graph indicating voltage-current characteristics of the element oscillating an electromagnetic wave which is provided in the electromagnetic wave transmission device of the present embodiment and a graph showing voltage-output level characteristics.

Next, a supplementary explanation on a relationship between each voltage value of the voltage-current characteristics of the RTD and a voltage-output carrier level in the present embodiment is given referring to FIG. 9A and FIG. 9B.

First Example

FIG. 9A is a diagram showing a first example of a relationship between a graph indicating the voltage-current characteristics of the RTD and a graph indicating voltage (bias voltage)-output level characteristics in the present embodiment.

The graph indicating the voltage-current characteristics of the RTD is as the aforementioned explanation of FIG. 3.

In contrast, as shown in FIG. 9A, in the graph indicating the voltage-output level characteristics, an output level does not have a proportional relationship with respect to the voltage, but shows a curve in which as the voltage value becomes greater, the output level increases from the minimum value to the maximum value and then becomes to the minimum value again.

Here, according to the voltage-output level characteristics shown by the curve, the conversion unit 24 converts the first voltage values of two or more levels (three voltage values in this case) in the first voltage region RA, and the second voltage value and the third voltage value to output carrier levels $O_1$, $O_2$, $O_3$, and $O_4$ which each correspond to each of the voltage values such that the first voltage values, and the second voltage value and the third voltage value have a predetermined relationship of the output carrier level. Then, in a case of the first example of the present embodiment, the predetermined relationship of the output carrier level is a relationship which is set to a relationship (a relationship in which a difference $\Delta O_{12}$ between $O_1$ and $O_2$, a difference $O_{23}$ between $O_2$ and $O_3$, and a difference $\Delta O_{34}$ between $O_3$ and $O_4$ are all the same) in which the output carrier levels $O_1$, $O_2$, $O_3$, and $O_4$ which each correspond to each voltage value are aligned at constant intervals on the output level (due to that, the first voltage values of two or more levels in the first voltage region RA are not aligned at constant intervals).

As described above, the first example of the present embodiment can allow the reduction of data transition time to generate the modulation data including at least one of the second voltage region RB and the third voltage region RC which are normally used as the non-oscillation regions. Along with this, power saving can be achieved.

Second Example

Then, a different point in the second example from the case of the first example will be explained referring to FIG. 9B.

In a case of the second example, the predetermined relationship of the output carrier level is a relationship in which with respect to the output carrier levels $O_1$, $O_2$, $O_3$, and $O_4$ which each correspond to each voltage value, on the output level, the maximum value $O_4$ of the output carrier levels $O_1$, $O_2$, $O_3$, and $O_4$ which each correspond to each voltage value is set to a smaller value than the maximum value of the voltage-output level characteristics. Thus, the second example allows the output carrier level $O_4$ to be accurately outputted compared to the case of the first example. This is due to that a curve of the voltage-output level characteristics of the RTD fluctuates in a case where heat is generated by a voltage application of the RTD. Other effects of the second example are the same as the case of the first example.

Third Example

Figure 9C:
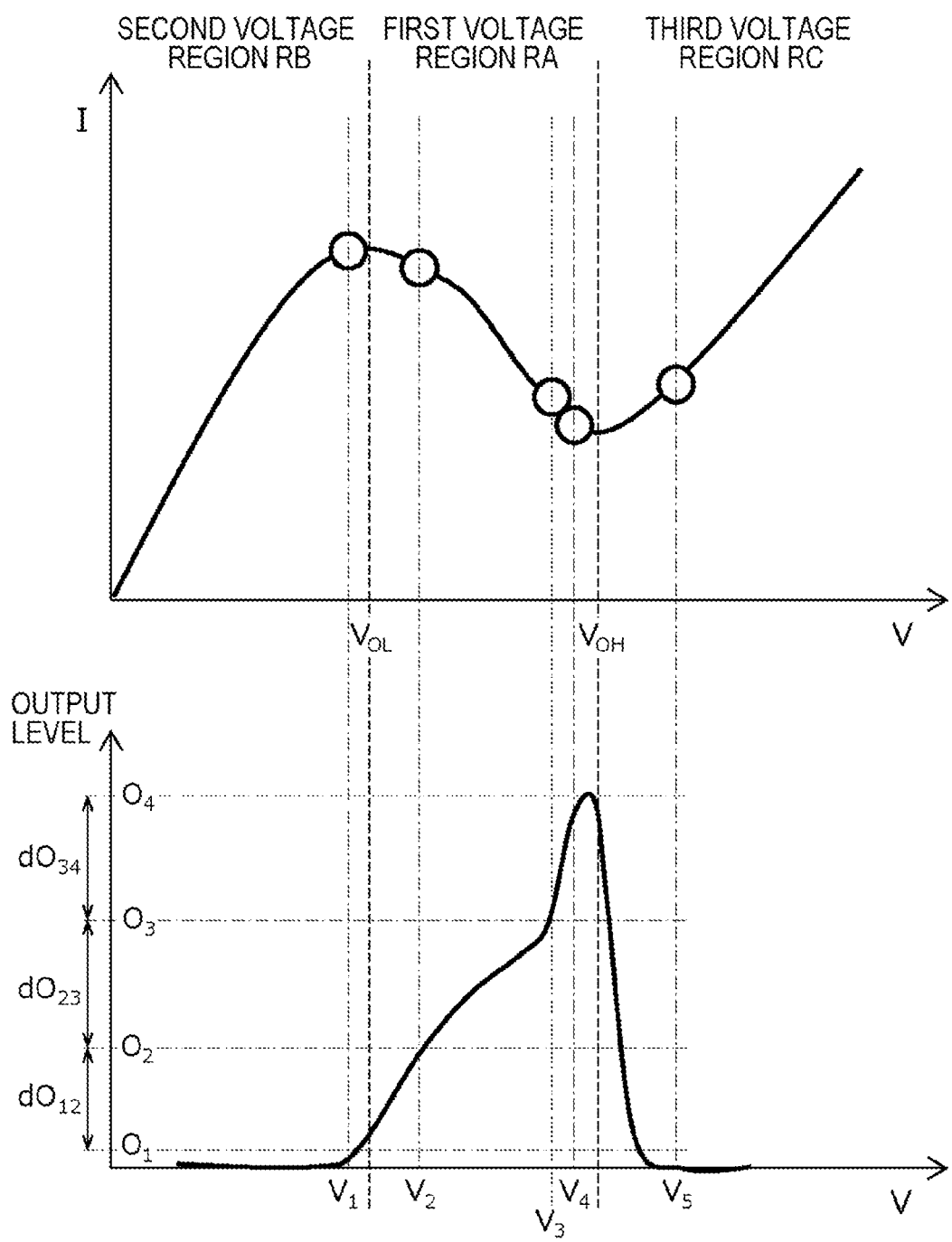
FIG. 9C is a diagram showing a third example of a relationship between a graph indicating voltage-current characteristics of the element oscillating an electromagnetic wave which is provided in the electromagnetic wave transmission device of the present embodiment and a graph showing voltage-output level characteristics.

Then, a different point in the third example from the case of the first example will be explained referring to FIG. 9C.

In a case of the third example, the predetermined relationship of the output carrier level is a relationship in which with respect to the output carrier levels $O_1$, $O_2$, $O_3$, and $O_4$ which each correspond to each voltage value, on the output level, the minimum value $O_1$ of the output carrier levels $O_1$, $O_2$, $O_3$, and $O_4$ which each correspond to each voltage value is set to a greater value than the minimum value of the voltage-output level characteristics. Thus, the third example facilitates the output carrier level $O_1$ to be accurately outputted compared to the case of the first example and the second example. This is due to that the curve of the voltage-output level characteristics fluctuates by a noise when the curve is nearer to the minimum value (the curve is nearer to zero).

Other effects of the third example are the same as those of the first example.

Fourth Example

Then, a different point in the fourth example from the first example, the second example, and the third example will be explained referring to FIG. 9D.

In a case of the fourth example, the predetermined relationship of the output carrier level is a relationship in which the maximum value $O_4$ of the output carrier levels $O_1$, $O_2$, $O_3$, and $O_4$ which each correspond to each voltage value is set to the smaller value than the maximum value of the voltage-output level characteristics, and the minimum value $O_1$ is set to a value which is greater than the minimum value of the voltage-output level characteristics. That is, the fourth example is an example in which the second example and the third example are combined.

Accordingly, effects of the fourth example are the same as those of the first example, the second example, and the third example.

As shown above, a specific embodiment regarding the present invention is explained as an example, the present invention is not limited to the embodiment. For example, an embodiment (a modification example) as shown below is also included in a technical scope of the present invention.

For example, in the present embodiment, the explanation is made with the voltage values at three levels in the first voltage region RA as a set voltage level. However, the set voltage level in the first voltage region RA only needs to be two or more levels.

In addition, in the present embodiment, the pattern of the synchronizing signal is explained as $V_{sync1}$, $V_{sync2}$, and $V_{sync3}$ of FIG. 4 and $V_{sync4}$ and $V_{sync5}$ of FIG. 5. However, the pattern of the synchronizing signal may be a pattern which is different from these.

Meanwhile, in the explanation of the present embodiment, the pattern of the synchronizing signal is explained with $V_{sync1}$, $V_{sync2}$, and $V_{sync3}$ of FIG. 4 and $V_{sync4}$ and $V_{sync5}$ of FIG. 5 as examples. However, an embodiment which belongs to the technical scope of the present invention may be an embodiment which includes any one of these patterns of the synchronizing signal or a modification thereof. That is, the synchronizing signal only needs to be any one of (1) a signal which includes the second voltage value $V_1$ of the second voltage region RB and does not include the third voltage value $V_5$ of the third voltage region RC, (2) a signal which does not include the second voltage value $V_1$ of the second voltage region RB and includes the third voltage value $V_5$ of the third voltage region RC, and (3) a signal which includes the second voltage value $V_1$ of the second voltage region RB and the third voltage value $V_5$ of the third voltage region RC.

Further, in the present embodiment, it is explained that the synchronizing signal level conversion unit 24B, which may be provided in later paragraphs, includes the multi-valuing extension unit 24B2 and the voltage conversion unit 24B3 (see FIG. 2B) due to the same configuration. However, for example, the multi-valuing extension unit 24B2 and the voltage conversion unit 24B3 may be extracted from the synchronizing signal level conversion unit 24B and the multi-valuing extension unit 24B2 and the voltage conversion unit 24B3 may be provided between the selector 26B and the transmission unit 28.

This application claims priority from Japanese Patent Application No. 2019-080688, filed on Apr. 22, 2019, the disclosure of which is incorporated herein by reference in its entirety.

REFERENCE SIGNS LIST 10 electromagnetic wave communication system
20 electromagnetic wave transmission device
22 acquisition unit
24 conversion unit (example of modulation unit)
24A multi-value level conversion unit
24B synchronizing signal level conversion unit
24B1 multi-valuing unit
24B2 multi-valuing extension unit
24B3 voltage conversion unit
26A switching unit
26B selector
28 transmission unit
30 electromagnetic wave reception device
RA first voltage region
RB second voltage region
RC third voltage region
$V_1$ second voltage value
$V_2$, $V_3$, $V_4$ first voltage value
$V_5$ third voltage value
W electromagnetic wave (example of terahertz wave)

The invention claimed is:

1. An electromagnetic wave transmission device comprising:
a transmission unit that has, in voltage-current characteristics, a local maximum value and a local minimum value located on a higher voltage side than the local maximum value and transmits an electromagnetic wave indicating a modulation signal;
an acquisition unit acquiring a digital signal; and
a modulation unit modulating the digital signal to the modulation signal using first voltage values of two or more levels in a first voltage region, which is a voltage region which is equal to or greater than a voltage of the local maximum value and is equal to or less than a voltage of the local minimum value, and a second voltage value in a second voltage region, which is a voltage region less than the voltage of the local maximum value, and a third voltage value in a third voltage region, which is a voltage region on a higher voltage side than the voltage of the local minimum value,
wherein a first signal which transits from any voltage value out of the first voltage values of two or more levels in the first voltage region to any one voltage value out of voltage values of two or more levels of the first voltage values via the second voltage value, and a second signal which transits from the any voltage value to the any one voltage value via the third voltage value are the same signals, and
wherein the modulation unit selects, out of the first signal and the second signal, the signal having a smaller total transition potential difference of the modulation signal in a case where a total transition potential difference of the first signal and a total transition potential difference of the second signal are different.

2. The electromagnetic wave transmission device according to claim 1,
wherein each potential difference between each of the voltage values of two or more levels of the first voltage values and the second voltage value is a different potential difference from each potential difference between each of the voltage values of two or more levels of the first voltage values and the third voltage value.

3. The electromagnetic wave transmission device according to claim 1,
wherein, in a case where each of the voltage values of two or more levels of the first voltage values, the second voltage value, and the third voltage value are aligned in order from the smallest value, respective potential differences of voltage values which are adjacent to each other are different.

4. The electromagnetic wave transmission device according to claim 1,
wherein the conversion unit selects the first signal in a case where a total transition potential difference of the first signal and a total transition potential difference of the second signal are the same.

5. The electromagnetic wave transmission device according claim 1,
wherein, according to bias voltage-output level characteristics shown by a curve, the conversion unit converts the first voltage values of two or more levels in the first voltage region, and the second voltage value and the third voltage value to output carrier levels which each correspond to each of the voltage values such that the first voltage values, and the second voltage value and the third voltage value have a predetermined relationship of the output carrier level.

6. The electromagnetic wave transmission device according to claim 5,
wherein the predetermined relationship of the output carrier level is a relationship in which the output carrier levels which each correspond to each voltage value are aligned at constant intervals on an output level.

7. The electromagnetic wave transmission device according to claim 5,
wherein the bias voltage-output level characteristics indicate a curve which increases from a minimum value to a maximum value and then becomes a minimum value again as the voltage value becomes greater, and
wherein a maximum value of the output carrier levels which each correspond to each voltage value is set to a smaller value than the maximum value of the bias voltage-output level characteristics.

8. The electromagnetic wave transmission device according to claim 5,
wherein the bias voltage-output level characteristics indicate a curve which increases from a minimum value to a maximum value and then becomes a minimum value again as the voltage value becomes greater, and
wherein a minimum value of the output carrier levels which each correspond to each voltage value is set to a greater value than the minimum value of the bias voltage-output level characteristics.

9. The electromagnetic wave transmission device according to claim 1,
wherein the electromagnetic wave is a terahertz wave.

10. An electromagnetic wave communication system comprising:
the electromagnetic wave transmission device according to claim 1, and
an electromagnetic wave reception device which receives an electromagnetic wave transmitted by the electromagnetic wave transmission device and demodulates the electromagnetic wave to a digital signal.

* * * * *